United States Patent [19]

Ebersohl et al.

[11] Patent Number: 5,648,917
[45] Date of Patent: Jul. 15, 1997

[54] SELF-MONITORING CIRCUIT, ESPECIALLY FOR ELECTRICAL EQUIPMENT, AND IN PARTICULAR FOR A HIGH TENSION SF$_6$ CIRCUIT BREAKER

[75] Inventors: Gérard Ebersohl, La Mulatiere; Olfa Chetay, Venissieux, both of France

[73] Assignee: Gec Alsthom T&D SA, Paris, France

[21] Appl. No.: 535,827

[22] Filed: Sep. 28, 1995

[30] Foreign Application Priority Data

Sep. 29, 1994 [FR] France .................. 94 11638

[51] Int. Cl.$^6$ .................................................. H01H 73/00
[52] U.S. Cl. .................. 364/514 C; 364/514 R; 340/825.06; 307/11
[58] Field of Search .................. 364/514 R, 550, 364/492, 514 C; 340/825.06, 825.07; 307/11, 31, 38; 335/6, 18

[56] References Cited

U.S. PATENT DOCUMENTS

| 4,161,027 | 7/1979 | Russell ........................ 364/492 |
| 5,224,054 | 6/1993 | Wallis . |
| 5,413,411 | 5/1995 | Ebersohl . |
| 5,475,609 | 12/1995 | Apothaler ........................ 364/492 |

FOREIGN PATENT DOCUMENTS

WO8912345  12/1989  WIPO .

OTHER PUBLICATIONS

*ETZ*, Jun. 1988, West Germany, vol. 109, No. 12, 1988 ISSN 0170-1711, pp. 546–549, Steig, K–M et al, "Nahtstellensystem fur Software zur Netzbetriebsfuhrung".

*Primary Examiner*—Ellis R. Ramirez
*Assistant Examiner*—Thomas Peeso
*Attorney, Agent, or Firm*—Sughrue, Mion, Zinn, Macpeak & Seas

[57] ABSTRACT

A circuit for automatically monitoring equipment, including a plurality of transducers for measuring operating parameters and providing data to a multiprocessor system comprising stations interconnected by a local network and constituting a distributed database, the system being capable of interchanging data with a higher level including a computer with a bridge connected to said network, wherein said bridge is a "terminal" microcontroller interchanging data with the stations via first messages corresponding to requests issued by the terminal and received by all of the stations in determined memory zones referred to as "first dedicated zones", and second messages corresponding to response from the interrogated stations and received by said terminal in determined memory zones, referred to as "second dedicated zones".

7 Claims, 2 Drawing Sheets

SELF-MONITORING CIRCUIT, ESPECIALLY FOR ELECTRICAL EQUIPMENT, AND IN PARTICULAR FOR A HIGH TENSION SF$_6$ CIRCUIT BREAKER

The present invention relates to a self-monitoring circuit for equipment, in particular electrical equipment such as an SF$_6$ high tension circuit breaker. This particular application for the invention is described below, but it should be understood that the invention can be applied to monitoring any equipment in which it is possible to modify parameters of use or of operation.

BACKGROUND OF THE INVENTION

In the document CIGRE, Session 1994, Aug. 28–Sep. 3, the Applicant has described in an article entitled "Introducing digital electronics in equipment auxiliaries, and improvement of reliability", by E. Thuries, G. Ebersohl, J. P. Dupraz, O. Chetay, and J. P. Moncorgé, a circuit for self-monitoring and checking of a high tension circuit breaker, and the main features thereof are described below.

That circuit comprises a level zero shown in accompanying FIG. 1. It includes transducers for monitoring operating parameters of the equipment, and in particular:

for each pole of the circuit breaker, a transducer CAO indicating that the pole is in its open position;

for each pole of the circuit breaker, a transducer CAF indicating that the pole is in its closed position;

for each pole, a transducer SF$_6$ delivering the pressure of the SF$_6$ insulating gas within the pole;

a transducer P indicating the oil pressure in the circuit breaker control means; and for each pole, a transducer U generating an indication enabling pole wear to be evaluated on the basis of the current passing through the pole as measured by a current transformer TI.

The data from all the above transducers is applied to a multiprocessor system SMP constituting a local distributed database; the system SMP also receives orders to open and close the circuit breaker from controllers and protective equipment situated in level 1, and represented in the figure by rectangle PRA.

The system SMP talks with the stage PRA via a microcontroller MBD referred to as a remote terminal microcontroller since it is located remotely from the circuit breaker being monitored. The microcontroller MBD constitutes a database which is a replica of the database in the system SMP.

The link between the microcontroller MBD and the system SMP is provided over optical fiber links that are not sensitive to electromagnetic disturbances.

The stage PRA may be connected to the microcontroller MBD in various different ways depending on whether the monitoring/control architecture of the station is conventional or digital. If conventional, parallel links (preferably via optical fibers) serve to transmit orders for opening and closing O/C, signalling SIG, and database access ABD.

If digital, the same interchanges are possible either via a two-way serial optical link or else, and preferably, by direct access to the dual-input memory that contains the database.

The function of the circuit SMP is as follows:

driving in appropriate manner the open and close coils (BO, BF) without any conventional contact in the command chain, using static switches (ISO and ISF respectively);

generating position information relating to the circuit breaker with a very high degree of security, by implementing an algorithm that takes advantage, in particular, of the redundancy provided by the transducers CAO and CAF, and also of any mismatch information that may arise;

ensuring that all three poles reopen automatically in the event of mismatch on closing;

for each operation, providing timing of two characteristic durations, namely the duration between receiving the order and leaving an initial position, and the duration between leaving the initial position and reaching the final position;

ensuring the hydraulic control system is repressurized by means of a pump P and also via circuits that do not include any conventional contact, by virtue in particular of a static switch ISP; and generating signalling, alarms, and interlocks for any observed failure during self-testing controlled by the circuit SMP, whether applicable to the transducers or to the hydraulic control circuits.

FIG. 2 is a block diagram of the multiprocessor system SMP.

The system is made up of a plurality of microcontrollers each constituting a respective database that serves not only to provide respective applications software but also software for communication with a local network RL that enables the distributed database to be managed and periodically refreshed, and that serves, in particular, to ensure that the same data is recorded simultaneously in each of the distributed databases. One such local network is described in document FR-A-92/06921.

Three microcontrollers S1, S2, S3 (stations No. 1, 2, and 3) associated with the position sensors CAO and CAF for each of the three phases A, B, and C of the circuit breaker perform the following functions:

periodic self-testing of the position transducers, determining the positions of the poles while in the standby state and while being driven;

applying appropriate commands to the coils BF and BO via the static switches ISF and ISO on the basis of orders acquired in the remote terminal microcontroller MBD;

continuous self-monitoring of the command circuits, including the static switches ISF and ISO;

timing the operating durations of the poles while they are being driven; and recording all of the above information in the distributed database.

The microcontroller MaD (station No. 0, interface) has the following main functions:

acquisition, from Level 1, of open and close orders and recording of said information in the database, and consequently forwarding it to the stations;

determining the position of the circuit breaker on the basis of the information produced by the microcontrollers associated with each of the phases (S1, S2, and S3);

responding automatically to pole position mismatch;

generating and issuing alarms whenever failures are observed, whether during self-testing or because the poles are in abnormal positions; and generating an alarm indicating failure of a station or of the local network.

A microcontroller S7 (station No. 7) deals with mechanical monitoring and makes use of the time-related data generated by the microcontrollers S1 to S3. This data is accessible in the database and makes it possible to monitor the following:

the maximum duration of an opening or of a closing operation for each pole;

the average speeds of the primary contacts;

possible lack of synchronization between the poles; and keeping a count of the operations performed by each pole.

Operating anomalies are encoded and stored for subsequent analysis of the behavior of the circuit breaker.

Two microcontrollers S5 and S6 (stations No. 5 and No. 6) serve respectively, for each pole, to monitor the electrical wear of its contacts and the density of its insulating $SF_6$ gas.

For this purpose, station No. 5 receives data in its database relating to open and close orders; in response, this station provides "electrical wear" data.

Station No. 6 enriches the distributed database with $SF_6$ data relating to each pole. The stations S1 and S2 thus have access to the information concerning them and they can adopt an appropriate corresponding strategy on receiving an order.

Microcontroller GR manages the local network RL by specifying within the frames thereof which stations are consuming and/or producing such and such a data item, and it does this at the rate with which each data item in the distributed database is periodically refreshed.

A special card TB referred to as the "bus translator" translates between a wire bus and an optical bus BO. For reasons of electromagnetic compatibility, the copper wire bus is thus rigorously confined within an electronics rack, while optical links are used whenever it is necessary to avoid pick-up of external disturbances.

A microcontroller S4 (station No. 4) provides a software bridge between the network RL and a serial link LS going to the Level 1 microcomputer which is preferably of the PC (personal computer) type and which is referred to below by the letters PC.

For maintenance purposes, this link makes it possible to establish a man-machine interface for the purpose of reading the information contained in the distributed database.

OBJECTS AND SUMMARY OF THE INVENTION

An object of the invention is to organize the above station and its programming so as to make it possible from the local PC or remotely to modify operating thresholds of the system (e.g. $SF_6$ alarms).

The invention provides a circuit for self-monitoring of equipment including a plurality of transducers for measuring operating parameters of said equipment, said measuring transducers providing data to a multiprocessor system comprising stations interconnected by a local network under the control of a network controller and constituting a distributed database that is refreshed periodically at given rates, the system being capable of receiving instructions from a higher level and of delivering responses thereto, said higher level including a computer connected by a serial link to a bridge itself connected to said network, wherein said bridge is a microcontroller which is connected to said network and which is referred to as a "terminal", said terminal interchanging data with the stations via first messages corresponding to requests issued by the terminal and received by all of the stations in determined memory zones referred to as "first dedicated zones", and second messages corresponding to response from the interrogated stations and received by said terminal in determined memory zones, referred to as "second dedicated zones".

Advantageously, the terminal is configured to be a sink for all of the data in the distributed database and a source for messages concerning transaction requests.

Transaction requests may be requests to read a parameter in the memory of a given station of the system or to write a new value for a parameter at a determined address in the memory of a given station.

A request to write a new parameter is made up of two words issued by the terminal and each comprising two bytes, the first word indicating the nature of the transaction, the number of the destination station, and the page number and the index in the memory where the new parameter is to be stored, and the second word comprising the value of the new parameter formatted on 14 bits, with two bits being used for verifying the transaction.

A read request comprises a word issued by the terminal formatted on two bytes and indicating the nature of the transaction, the number of the destination station, and the page number and the index in the memory where the parameter is to be found, the response of the requested station being constituted by a two-byte word containing the value of the parameter read at the specific address, said word being formatted on 14 bits, with two bits being used for verifying the transaction.

The invention also provides electrical equipment including a self-monitoring circuit as specified above.

The invention also provides a high tension $SF_6$ circuit breaker including a self-monitoring circuit as specified above.

BRIEF DESCRIPTION OF THE DRAWINGS

The invention is now explained with reference to the accompanying drawings, in which.

MORE DETAILED DESCRIPTION

Figure 1:
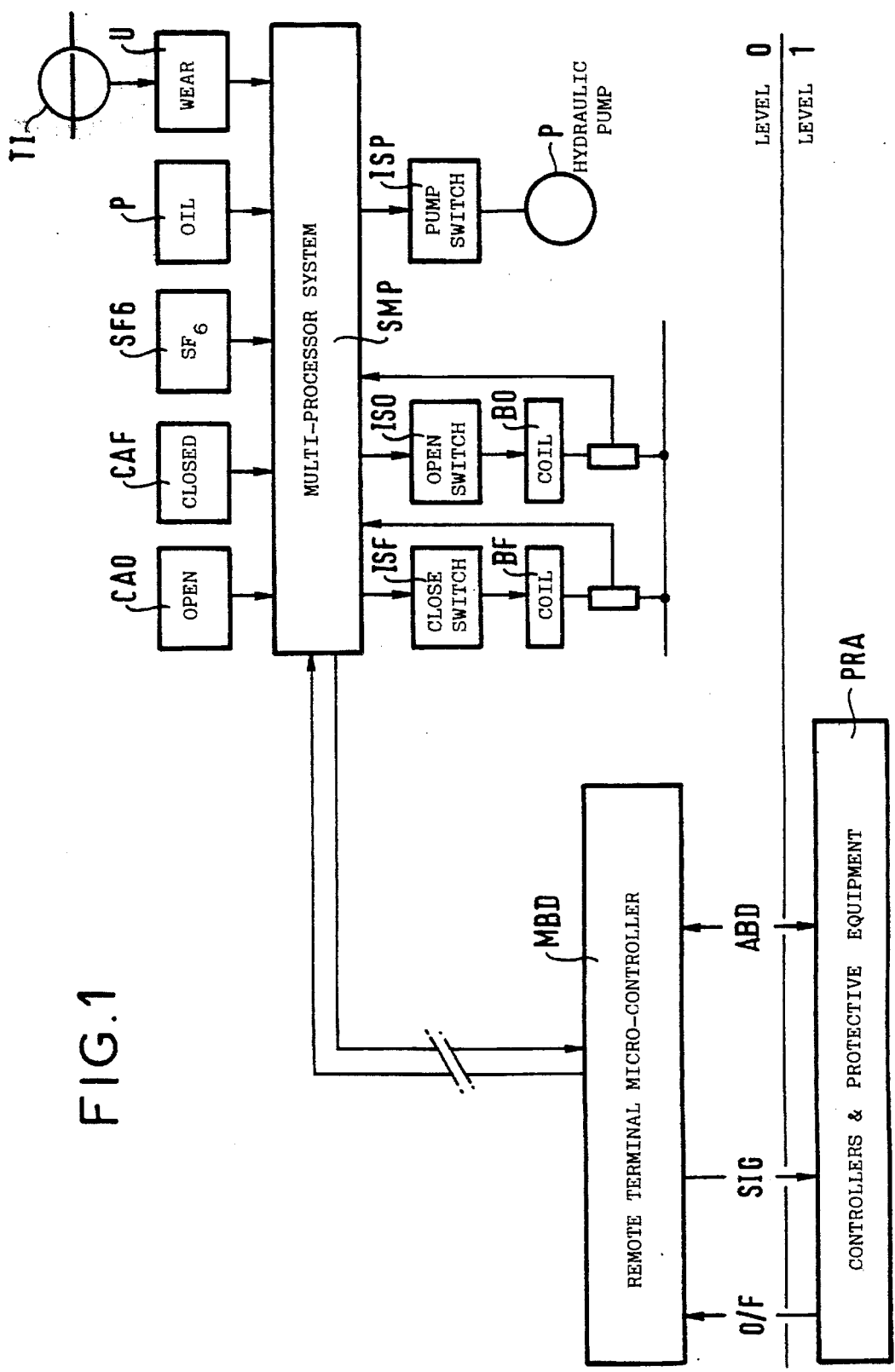
FIG. 1 is a block diagram of a prior art circuit for self-monitoring and checking of a circuit breaker.
Figure 2:
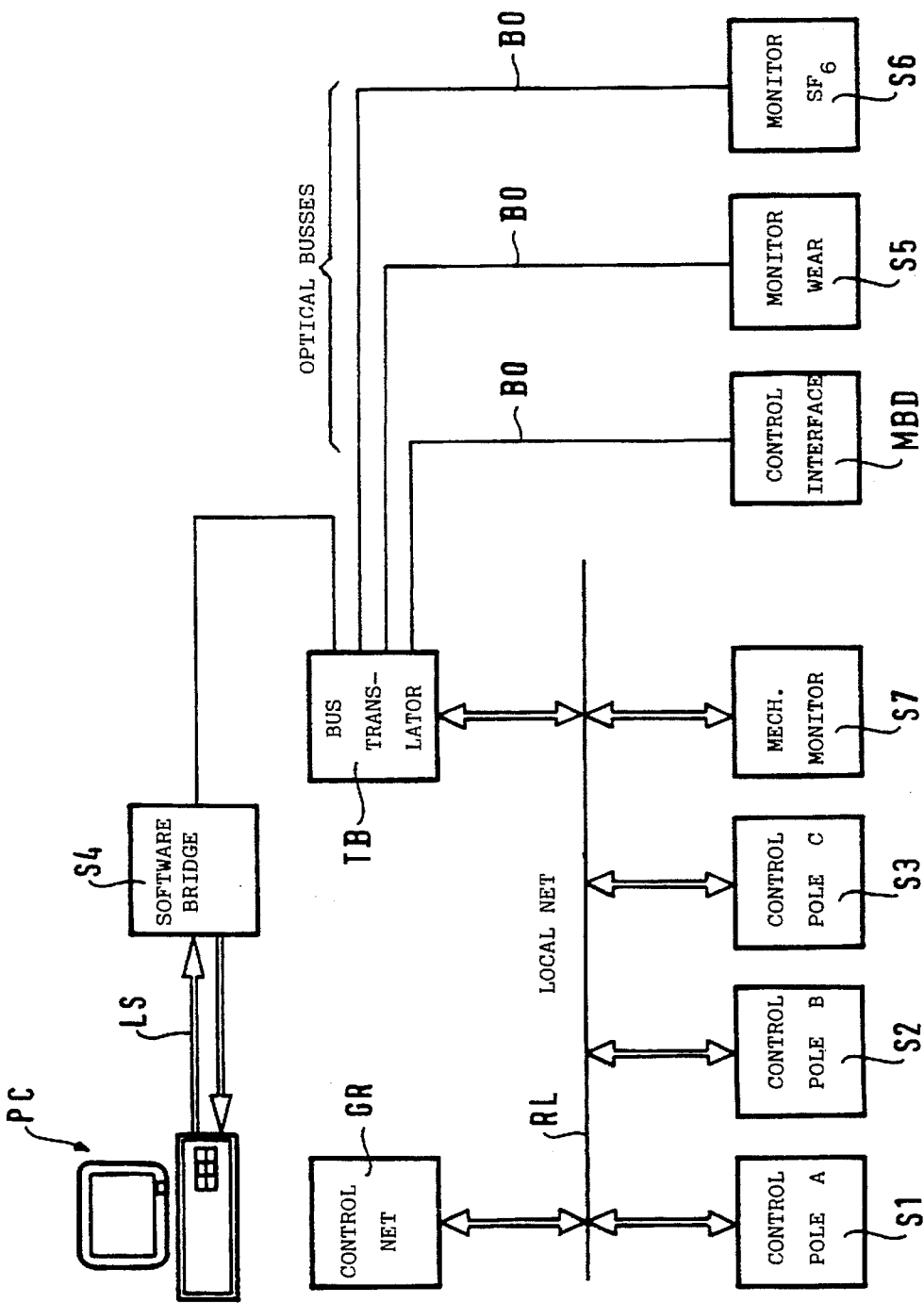
FIG. 2 is a block diagram of the multiprocessor system forming a portion of the FIG. 1 circuit.

Station No. 4, also referred to as a terminal, contains its own database, as do all the other stations in the multiprocessor system. The data comprises two-byte words stored at specified addresses (by page and by index within the page). The data is classified in two types:

data that is periodically refreshed cyclically on a continuous basis by frames issued by the network manager GR. This data can therefore be continuously presented by the station producing it; and non-periodic data that generally corresponds to monitoring thresholds, and for which changes and consequently data acquisition events, are very unusual and are performed from station No. 4. This data is therefore presented to the receiver station only at the instant it is changed.

These two types of data occupy two clearly distinct zones in the database: a zone referred to as "0" for the a periodic data; and a zone referred to as "1" for the periodic data.

For the purposes of the problem, which is to receive from other stations or to transmit to other stations messages relating to changes of threshold values for certain aperiodic data, provision is made in station 4 to reserve two memory zones in zone "0", referred to as "first" dedicated memory zones, and each being two 8-bit bytes in size, which zones are referred to below as BAL1 and BAL2. By way of example, these "letterboxes" occupy the following addresses or indexes with page 0 of the memory: for BAL1, FCh and FDh, and for BAL2 FEh and FFh (where the numbers are in hexadecimal). Provision is also made to reserve i 2-byte memory zones in zone "0" of the database of station 4, where i is the number of stations in the multiprocessor system, these zones being referred to as "second" dedicated memory zones and being given BAL3i, and located, for example, in such a manner that the index of the first byte is ECh+2i and that of the second byte is EDh+2i.

It may be observed that the network manager GR labels station No. 4 as producing the data contained in memories BAL1 and BAL2 (it constitutes a "source") while the other stations are consumers of that data (they constitute "sinks"). In addition, station No. 4 is a sink for all of the data in the distributed database.

For the data in memories BAL3i, each of the memories BAL is associated with the corresponding station i in such a manner that a station i is configured as being the source for the contents of the associated memory BAL3i, while only station No. 4 is a sink therefore, and thus receives the contents of all of the memories BAL3i.

The memory BAL1 relates to a transaction request by the PC. The term "transaction" is used to mean either a request to read a parameter, or else a request to write a new value for a parameter.

The table represents a memory BAL1, which comprises two bytes at addresses FCh and FDh respectively, each byte comprising eight data bits D0 to D7:

| | BAL1 (transaction request) | | | | | | | |
|---|---|---|---|---|---|---|---|---|
| | D7 | D6 | D5 | D4 | D3 | D2 | D1 | D0 |
| FCh | nature of op. | | memory page # | | | requested station # | | |
| FDh | address (parameter index in the page) | | | | | | | |

The bits D7 and D6 of the first byte serve to define the nature of the operation using the following code:

| Nature of the operation | D7 | D6 |
|---|---|---|
| none (no operation) | 0 | 0 |
| parameter write request | 1 | 0 |
| parameter read request | 0 | 1 |

These two "nature of the operation" bits are for dialog between the communication processor of station 4 and the requested station. The number of the requested station is given by bits D0 to D2 in the first byte, and the number of the memory page for the station concerned by the transaction is designated by bits D3 to D5 of the first byte.

The contents of the second byte serves to designate the index in the page of the memory of the requested station.

Thus, if information is to be written at index 43 of page 3 in the memory of station No. 5 the "transaction request" word will be as follows:

```
10011101
01000011
```

The memory BAL2 serves to receive the new parameter to be written, and referred to below as "data from PC"; this parameter is formatted on 14 bits, namely the bits marked x in the diagram below, with bits D6 and D7 of the second byte being reserved for the protocol, as explained below.

| | D7 | D6 | | D5 | D4 | D3 | | D2 | D1 | D0 |
|---|---|---|---|---|---|---|---|---|---|---|
| BAL2 | x | x | | x | x | x | | x | x | x |
| (data from PC) | | | | x | x | x | | x | x | x |

The apparatus operates as follows:

1. A Request to Change a Parameter

If a user is authorized to change a parameter, e.g. during maintenance, the procedure begins by writing the new parameter in the data word of PC (BAL2) and then updating the "transaction request" (BAL1) as explained above.

Since the words BAL1 and BAL2 are in zone "0" they contain aperiodic data and as such they are sent to the stations via the local network under the control of the network controller GR. All the stations detect simultaneously the write request as specified by the respective values "1" and "0" of D6 and D7 in the first byte of the first word; only one of the stations recognizes its own address as encoded by the bits D0 to D2 of the first byte of the first word; this station then writes the new parameter read from BAL2 at the prescribed index in the prescribed page, and simultaneously it puts the parameter in its own BAL3i for checking by station No. 4. The 14 bits of the new parameter are thus stored in BAL3i, together with bits in D6 and D7 of the second byte of BAL3i (also referred to as "kind of data"), which bits have the following meanings:

| Kind of data | D7 | D6 |
|---|---|---|
| Data invalid | 0 | 0 |
| New parameter sucessfully received | 1 | 0 |
| The parameter requested for reading is valid | 0 | 1 |

In the present case of a write request, if the system has operated properly, then naturally the bits D7=1 and D6=0 are written in BAL3i.

The message BAL3i ("transaction response", station i) is received by station No. 4 which then updates its "kind of operation" bits (D7 and D6 at index FCh) to "00", thus indicating that there is no longer any current transaction, and then the requested station resets its "kind of data" to "00"; similarly, the non-requested stations keep their "kind of data" bits at "00", indicating that the "transaction response" data is invalid.

2. A Parameter Read Request

When the user desires to read aperiodic data from a page in zone "1" containing the parameters, the index of the parameter to be read is specified at FDh in BAL2 and the "transaction request" word (index FCh) is set up in BAL1 as follows:

- the bits D2D1D0 indicate the number of the requested station (e.g.: "110" for station 6);
- the bits D5D4D3 indicate the number of the memory page (e.g.: "001" for page 1); and
- the bits D7D6 indicate the nature of the operation: in this case it is a read request, so D7D6 are set to "01".

The message transmitted by the network is read by all of the stations; only the requested station recognizes itself and provides the response in its "transaction response, station i" words for which the index of the first byte is equal to ECh+2i, with the contents thereof being as specified below, where the letters y represent the parameter as encoded on 14 bits. Bits D7 and D6 of the second byte are encoded as "01" to indicate to station 4 that the data in the other 14 bits it contains is valid.

|  |  | D7 | D6 | D5 | D4 | D3 | D2 | D1 | D0 |
|---|---|---|---|---|---|---|---|---|---|
| BAL3 | ECh + 2i | y | y | y | y | y | y | y | y |
| trans. resp. i | EDh + 2i | 0 | 1 | y | y | y | y | y | y |

When the requested station has replied, station 4 verifies the validity of the data received in response to its request in BAL3i, and then resets the "kind of operation" bits (D1D0 at index FCh) to "00", thus indicating that there is no longer any current transaction, and then the requested station (No. 6 in the present example) resets its "kind of data" bits to "00"; similarly, the non-requested stations keep their "kind of data" bits at "00" thus indicating that the corresponding "transaction response" data is invalid.

3. Extension of the Use of Dedicated Memory Zones

The PC can also request fault receipts or remote actions by placing its request in BAL1. The index FDh is used by the stations concerned.

It will also be understood that the data written by successive transactions via the PC, whether locally or remotely, enable binary data to be downloaded into zone "1", which data may consequently be executable by the application microcontroller of the station. By appropriate commands from the PC, the controller can thus execute short test or diagnostic programs.

The invention is not limited to controlling a circuit breaker. It applies mutatis mutandis to any equipment, whether electrical or otherwise, that includes measurement transducers or sensors providing data to a multiprocessor system made up of stations interconnected by a network under the control of a network controller and constituting a distributed database that is updated periodically at given rates, with the network also being capable of receiving instructions or orders from a higher level.

The invention provides for self-monitoring of equipment, especially electrical equipment and in particular circuit breakers, thereby making it possible, for example, to perform predictive maintenance and to operate under fault conditions between two maintenance periods.

We claim:

1. A circuit for self-monitoring of equipment including a plurality of transducers for measuring operating parameters of said equipment, said measuring transducers providing data to a multiprocessor system comprising stations interconnected by a local network under the control of a network controller and constituting a distributed database that is refreshed periodically at given rates, the system being capable of receiving instructions from a higher level and of delivering responses thereto, said higher level including a computer connected by a serial link to a bridge itself connected to said network, wherein said bridge is a microcontroller which is connected to said network and which is referred to as a terminal, said terminal interchanging data with the stations via first messages corresponding to requests issued by the terminal and received by all of the stations in determined memory zones referred to as first dedicated zones, and second messages corresponding to response from the interrogated stations and received by said terminal in determined memory zones, referred to as second dedicated zones.

2. A circuit according to claim 1, wherein the terminal is configured to be a sink for all of the data in the distributed database and a source for messages concerning transaction requests.

3. A circuit according to claim 2, wherein transaction requests may be requests to read a parameter in the memory of a given station of the system or to write a new value for a parameter at a determined address in the memory of a given station.

4. A circuit according to claim 3, wherein a request to write a new parameter is made up of two words issued by the terminal and each comprising two bytes, the first word indicating the nature of the transaction, the number of the destination station, and the page number and the index in the memory where the new parameter is to be stored, and the second word comprising the value of the new parameter formatted on 14 bits, with two bits being used for verifying the transaction.

5. A circuit according to claim 3, wherein a read request comprises a word issued by the terminal formatted on two bytes and indicating the nature of the transaction, the number of the destination station, and the page number and the index in the memory where the parameter is to be found, the response of the requested station being constituted by a two-byte word containing the value of the parameter read at the specific address, said word being formatted on 14 bits, with two bits being used for verifying the transaction.

6. Electrical equipment including a self-monitoring circuit according to claim 1.

7. A high tension $SF_6$ circuit breaker including a self-monitoring circuit according to claim 1.

* * * * *